(12) United States Patent
Aten et al.

(10) Patent No.: US 8,192,677 B2
(45) Date of Patent: *Jun. 5, 2012

(54) CORE/SHELL POLYMER AND FLUOROPOLYMER BLENDING BLOW MOLDING AND BLOWN FILM PROCESS

(75) Inventors: Ralph Munson Aten, Chadds Ford, PA (US); Sharon Ann Libert, Hockessin, DE (US); Heidi Elizabeth Burch, Parkersburg, WV (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/328,811

(22) Filed: Dec. 5, 2008

(65) Prior Publication Data

US 2009/0200711 A1 Aug. 13, 2009

Related U.S. Application Data

(60) Provisional application No. 61/013,090, filed on Dec. 12, 2007.

(51) Int. Cl.
*B29C 49/04* (2006.01)
(52) U.S. Cl. ............... 264/540; 264/171.26; 264/172.11
(58) Field of Classification Search ........................ None
See application file for complete search history.

(56) References Cited

U.S. PATENT DOCUMENTS

| | | | |
|---|---|---|---|
| 3,005,795 A * | 10/1961 | Bowers, III et al. | 525/154 |
| 3,819,594 A | 6/1974 | Holmes et al. | |
| 4,380,618 A | 4/1983 | Khan et al. | |
| 4,743,658 A | 5/1988 | Imbalzano et al. | |
| 4,849,469 A * | 7/1989 | Crosby et al. | 524/439 |
| 4,904,726 A * | 2/1990 | Morgan et al. | 524/520 |
| 5,273,706 A * | 12/1993 | Laughner | 264/540 |
| 5,603,999 A | 2/1997 | Namura et al. | |
| 5,677,404 A | 10/1997 | Blair | |
| 5,688,457 A * | 11/1997 | Buckmaster et al. | 264/211 |
| 5,885,494 A * | 3/1999 | Venkataraman et al. | 264/46.5 |
| 6,841,594 B2 | 1/2005 | Jones et al. | |
| 6,870,020 B2 | 3/2005 | Aten et al. | |
| 2007/0117929 A1 | 5/2007 | Burch et al. | |
| 2007/0117930 A1 | 5/2007 | Venkataraman et al. | |
| 2007/0117935 A1 | 5/2007 | Aten et al. | |
| 2009/0152776 A1* | 6/2009 | Aten et al. | 264/563 |

FOREIGN PATENT DOCUMENTS

| DE | 19805832 A1 | 8/1999 |
|---|---|---|
| WO | 2007/056350 A1 | 5/2007 |
| WO | 2008/063561 A1 | 5/2008 |

OTHER PUBLICATIONS

I. I. Rubin, Ed., Handbook of Plastic Materials and Technology, New York, NY, John Wiley & Sons, Inc., 1990, p. 1066.

* cited by examiner

*Primary Examiner* — Monica A Huson

(57) ABSTRACT

A process is provided for extruding a partially crystalline melt-fabricable perfluoropolymers. The process comprises blow molding from a perfluoropolymer having polytetrafluoroethylene sub-micrometer particles dispersed therein. The perfluoropolymer composition is a core/shell polymer, with pelletized blend, a dispersion blend or a melt-mixed polymer.

13 Claims, 7 Drawing Sheets

5% PTFE Large Particle

5% PTFE Core/Shell Polymer

5% PTFE Large Particle

5% PTFE Small Particle

Comparative Example 1

Example 5a

Example 5b

Example 6

CORE/SHELL POLYMER AND FLUOROPOLYMER BLENDING BLOW MOLDING AND BLOWN FILM PROCESS

FIELD OF THE INVENTION

The present invention relates to a process for blow molding. More particularly, the present invention relates to a core/shell polymer and or fluoropolymer blend for use in blow molding.

BACKGROUND OF THE INVENTION

Blow molding is widely used to make hollow articles including bottles, jars, tanks (e.g. automobile gas tanks), and buoyant articles (e.g. floats).

In the blow molding process, molten polymer is extruded downward from a die, the extrudate forming a tube, called a parison. When the parison reaches the desired length, a two-piece mold closes, pinching off and sealing the bottom of the parison, and molding the top of the parison to form an article into the desired shape, such as the neck of the bottle. Gas is injected into the parison, expanding it to fill the mold, thereby giving the article its shape. The mold then opens and the article is separated from the mold, after which it may be subjected to further finishing, such as removal of mold flash. This cycle is repeated to create another article. The polymer used in blow molding must have sufficient melt strength so that the parison does not stretch or separate in the interval between the beginning of extrusion of the parison to the time when the parison has been expanded to fill the mold. Parison "hang time" is one method of determining if a polymer has sufficient melt strength for blow molding. The amount of time the formed parison can hang from the die without distortion is called "hang time". While an acceptable hang time is at least 6 seconds, and preferably 10 seconds, "hang time" is dependent on the machine and/or the article being molded. Longer "hang times" have little benefit because of the interest manufacturers have in high productivity, and also because during hang time, the polymer cools and increases in viscosity. For semicrystalline polymer, cooling eventually leads to crystallization. Increased viscosity and crystallization both make the polymer less melt fabricable and adversely affect the expansion of the parison to fill the mold.

Reference is made to Irvin I. Rubin's, *Handbook of Plastic Materials and Technology*, New York, N.Y.: Wiley, 1990, page 1066 which discloses that resins (polymers) that do not have melt strength, such as injection molding grades, are difficult to blow mold. What usually occurs is that the hanging parison begins to stretch or draw down under its own weight. The top part of the parison begins to thin, which, in turn, will lead to poor material distribution and ultimately poor part performance.

Polymers such as PFA (perfluoroalkoxy copolymer, a copolymer of tetrafluoroethylene (TFE) and perfluoro(alkyl vinyl ether) (PAVE)) and FEP (fluorinated ethylene propylene), a copolymer of hexafluoropropylene (HFP) and tetrafluoroethylene (TFE), have found only limited use in blow molding applications, such as in making small articles. PFA that is sufficiently low in viscosity to be extruded at reasonable rates does not have enough melt strength. Therefore, the parison exhibits short hang time and tends to sag or even separate or tear when attempts are made to form larger articles, such as 1 quart (0.95 liters) or larger containers, and particularly, 1 gallon (3.79 liters) or larger containers. PFA that has melt strength adequate to provide acceptable hang times extrudes too slowly for economical production. Furthermore, slow extrusion of the PFA results in cooling of the lower end of the parison, so that by the time extrusion is complete, the lower end has higher viscosity than the upper end of the parison and may have begun to crystallize. Attempting to expand such a parison, results in distorted articles and even articles with holes. This leads to product defects and high scrap levels. Similarly, FEP is subject to the same limitations that occur with PFA. In summary, these perfluoropolymers are limited in their utility in blow molding because as molded articles increase in size, production rates decrease and/or losses due to quality defects increase.

It is thus desirable, to provide melt-fabricable perfluoropolymers that are usable in the making of larger articles of high quality from the blow molding process which can be extruded rapidly to give a parison of sufficient strength that does not sag, separate or tear, in the interval between extrusion and expansion in the closed mold better than that possible with commercial PFA, FEP or other perfluoropolymers.

SUMMARY OF THE INVENTION

Briefly stated, and in accordance with one aspect of the present invention, there is provided a process comprising (a) extruding a partially crystalline melt-fabricable perfluoropolymer into an annular shape of predetermined length, and (b) pneumatically expanding said shape while in a melt-fabricable state, said perfluoropolymer containing an effective amount of dispersed sub-micrometer size PTFE particles to improve said extruding and expanding of said annular shape. The predetermined length is determined by the geometry of the article to be blow molded. The process described above, discloses improving said extruding and expanding of said shape: 1) produces reduced variation in the thickness of the annular shape; and/or 2) results in the annular shape having improved uniformity of the thickness of the annular shape. Additionally, the process described above for extruding and expanding comprises blow molding of the annular shape into an article.

Pursuant to another aspect of the present invention, there is provided a blow molding process comprising extruding a partially crystalline melt-fabricable perfluoropolymer having a Parison Hang Time of at least six (6) seconds and a melt flow rate of less than 6.0 g/10 min into an annular shape and expanding said shape while in a melt-fabricable state.

BRIEF DESCRIPTION OF THE DRAWINGS

The invention will be more fully understood from the following detailed description, taken in connection with the accompanying drawings, in which.

Figure 1:
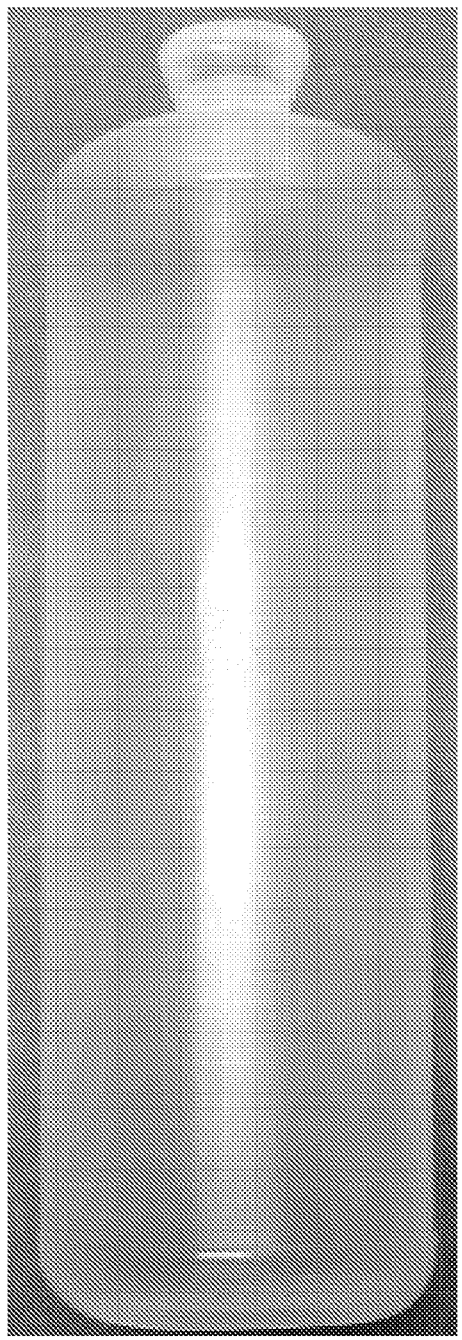
FIG. 1 discloses a 5 wt % PTFE core/shell polymer blow molded bottle.

While the present invention will be described in connection with a preferred embodiment thereof, it will be understood that it is not intended to limit the invention to that embodi-

DETAILED DESCRIPTION OF THE INVENTION

Perfluoropolymer compositions consisting of particles of polytetrafluoroethylene (PTFE) and melt fabricable perfluoropolymer are found to be useful in blow molding articles, particularly for those larger blow molding articles (such as but not limited to 1 quart (0.95 liters) or larger containers, and particularly, 1 gallon (3.79 liters) or larger containers) than can be readily made with melt fabricable perfluoropolymer by itself, at good production rates and with minimal losses due to quality defects. These perfluoropolymer compositions may be the result of blending dispersions of PTFE and of melt fabricable perfluoropolymer as described in U.S. Patent Application No. 2007/0117930 (dispersion blends), or they may be the product of core/shell polymerization to make an aqueous dispersion of particles having a PTFE core and a melt processible perfluoropolymer shell, as described in U.S. Patent Application No. 2007/0117935 (core/shell polymers). The dispersion is coagulated to separate the polymer from the dispersion medium; the polymer is isolated, dried, and preferably pelletized by melt extrusion, pellets being convenient for feeding to blow molding machines. Or, the perfluoropolymer composition may be the product of melt-mixing as described in U.S. Patent Application No. 2007/0117929 (melt-mixed polymers).

The melt-fabricability characterizing the core/shell polymer and the shell perfluoropolymer as well as the perfluoropolymer that is dispersion mixed with PTFE dispersion means that they are sufficiently flowable in the molten state that the polymers can be fabricated by melt processing that involves subjecting the polymer to shear, such as extrusion and injection molding, to produce products having sufficient strength so as to be useful. One attribute of the strength is the ability to repeatedly flex film made from pellets made by melt blending of the core/shell polymer or of the dispersion blended polymer, without cracking or breaking the film. In this regard, the polymer preferably exhibits an MIT Flex Life (i.e. 8 mil thick film) of at least about 500 cycles, more preferably at least about 1000 cycles, still more preferably at least about 2000 cycles and most preferably at least about 4000 cycles.

The PTFE polymer of the PTFE particles is not melt fabricable by conventional polymer processing methods such as extrusion and injection molding. Such PTFE is fabricated by sintering. This PTFE is not melt fabricable because it is not melt flowable. The non-melt flowability of the PTFE is characterized by high melt creep viscosity, sometimes called specific melt viscosity. This viscosity is determined by the measurement of the rate of elongation of a molten sliver of PTFE under a known tensile stress for 30 minutes, as further described and determined in accordance with U.S. Pat. No. 6,841,594, referring to the specific melt viscosity measurement procedure of U.S. Pat. No. 3,819,594. The molten sliver made in accordance with this test procedure is maintained under load for 30 minutes, before the measurement of melt creep viscosity is begun, and this measurement is then made during the next 30 minutes of applied load. The PTFE preferably has a melt creep viscosity of at least about $1 \times 10^6$ Pa·s, more preferably at least about $1 \times 10^7$ Pa·s, and most preferably at least about $1 \times 10^8$ Pa·s, all at 380° C. The PTFE is preferably homopolymer but may be what is known as modified PFTE that is polymer of TFE with small amounts of comonomer such as HFP or PAVE. These small amounts are insufficient to cause the melting point of the resulting polymer to be below 325° C. Comonomer amounts are preferably less than about 1 wt % of the combined TFE and comonomer weights in the polymer, and more preferably less than about 0.5 wt % of these combined weights. Also included in the class of PTFE polymer, according to this invention, is the sinterable, non-melt flowable modified PTFE having PAVE content of up to about 10 wt %. Such modified PTFE is described in U.S. Pat. No. 6,870,020.

The melt fabricable perfluoropolymer of the present invention includes copolymers of tetrafluoroethylene (TFE) with one or more polymerizable perfluorinated comonomers, such as perfluoroolefin having 3 to 8 carbon atoms, hexafluoropropylene (HFP), and/or perfluoro(alkyl vinyl ether) (PAVE) in which the linear or branched alkyl group contains 1 to 5 carbon atoms. Preferred PAVE monomers include perfluoro (methyl vinyl ether) (PMVE), perfluoro(ethyl vinyl ether) (PEVE), perfluoro(propyl vinyl ether) (PPVE), and perfluoro (butyl vinyl ether) (PBVE). The copolymer can be made using several PAVE monomers, such as the TFE/perfluoro (methyl vinyl ether)/perfluoro(propyl vinyl ether) copolymer, sometimes called MFA by the manufacturer. The preferred perfluoropolymers are TFE/HFP copolymer in which the HFP content is about 5-17 wt %, more preferably TFE/HFP/PAVE such as PEVE or PPVE, wherein the HFP content is about 5-17 wt % and the PAVE content, preferably PEVE, is about 0.2 to 4 wt %, the balance being TFE, to total 100 wt % for the copolymer. The TFE/HFP copolymers, whether or not a third comonomer is present, are commonly known as FEP. Also preferred are TFE/PAVE copolymers, generally known as PFA, having at least about 2 wt % PAVE of the total weight percent, including when the PAVE is PPVE or PEVE, and typically contain about 2-15 wt % PAVE. When PAVE includes PMVE, the composition is about 0.5-13 wt % perfluoro(methyl vinyl ether) and about 0.5 to 3 wt % PPVE, the remainder of the total of 100 weight percent being TFE, and as stated above, may be referred to as MFA.

The perfluoropolymers described above may have end groups that contain monovalent atoms other than fluorine, such as hydrogen or chlorine, which may be introduced by chain transfer agents such as ethane, methane or chloroform, or the —CH$_2$OH group introduced by methanol chain transfer agent. Similarly, stabilizing of fluoropolymers by what is known as humid heat treatment, described in U.S. Pat. No. 3,085,083, converts such thermally or hydrolytically unstable end groups like —COF and —COOH, to the more stable —CF$_2$H group, thereby introducing hydrogen atoms at the end(s) of the polymer chains. Such polymers are conventionally considered perfluoropolymers, and are considered perfluoropolymers for the purposes of this invention. End group stabilization may also be done by fluorinating the polymer to convert unstable end groups to —CF$_3$ groups. Fluorination is described in U.S. Pat. No. 4,743,658.

The size of the PTFE particles influences the performance of the perfluoropolymer compositions of the present invention when those compositions are made by blending dispersions. Variations in PTFE particle size in the PTFE dispersion can be achieved by controlling the aqueous polymerization of tetrafluoroethylene (TFE) in ways known by those of skill in the art. Examples of particle sizes made by polymerizing to make PTFE dispersion are provided herein. (See Table 1.) PTFE particles in the PTFE dispersion blended with melt fabricable perfluoropolymer dispersion are preferably in the range of not less than about 10 nm in the longest dimension, more preferably not less than about 20 nm. The PTFE particles are preferably less than about 150 nm, more preferably less than about 125 nm, and most preferably less than about 100 nm. A preferred range is 25-40 nm. Another preferred range is 50 to 100 nm.

For both the core/shell polymer and the dispersion blend polymer of the present invention, the PTFE component of the perfluoropolymer composition is at least about 0.1 wt % based upon the combined weights of the PTFE and the melt fabricable perfluoropolymer components. More preferably, the PTFE is at least about 0.5 wt % and still more preferably at least about 1 wt % based upon the combined weights of the PTFE and the melt fabricable perfluoropolymer components. The maximum PTFE component is preferably not more than about 50 wt % based upon the combined weights of the PTFE and melt fabricable perfluoropolymer components. More preferably, the PTFE component is not more than about 30 wt %, still more preferably not more than about 20 wt %, and most preferably not more than about 10 wt % based upon the combined weights of the PTFE and the melt fabricable perfluoropolymer components.

The melt flow rate (MFR) of the perfluoropolymers used in the present invention can vary widely, depending on the proportion of core PTFE, the melt-fabrication technique desired for the core/shell polymer, and the properties desired in the melt-fabricated article. It is possible for the MFR to be zero while still maintaining melt fabricability at higher shear rates due to the thixotropic nature of the perfluoropolymers used in the present invention. Thus, MFRs for the melt-fabricable perfluoropolymer can be in the range of about 0 to 500 g/10 min, but are typically preferred in the range of about 0 to 100 g/10 min, and more preferably in the range of about 0 to 50 g/10 min as measured according to ASTM D1238-94a and, following the detailed conditions disclosed in U.S. Pat. No. 4,952,630, at the temperature which is standard for the polymer. (See, for example, ASTM D 2116-91a and ASTM D 3307-93 that are applicable to the most common melt-fabricable fluoropolymers, both specifying 372° C. as the polymer melt temperature in the Plastometer®). The amount of polymer extruded from the Plastometer® in a measured amount of time is reported in units of g/10 min in accordance with Table 2 of ASTM D 1238-94a. For the perfluoropolymer composition made by dispersion blending, the MFR of the melt fabricable fluoropolymer is that of the melt fabricable fluoropolymer of the dispersion. For the perfluoropolymer composition made by core/shell polymerization, the MFR of the perfluoropolymer in the shell is determined by carrying out the polymerization of the perfluoromonomers used to form the melt fabricable perfluoropolymer by itself, i.e. with no core, using the same recipe and polymerization conditions used to form the shell, to obtain perfluoropolymer that can be used in the MFR determination.

The MFR of the core/shell polymer and of the polymer resulting from blending PTFE dispersion with dispersion of melt fabricable fluoropolymer is measured as described in the preceding paragraph, and is also in the range described in the preceding paragraph.

In addition to the dispersion of core/shell polymer and the blend of melt fabricable fluoropolymer and PTFE dispersions described above, it is also possible to blend dispersion of core/shell polymer with 1) PTFE dispersion to produce a polymer composition having higher PTFE particle content than the core/shell polymer alone; or with 2) melt fabricable fluoropolymer dispersion to produce a polymer composition having lower PTFE particle content than the core/shell polymer alone. This blending allows production of a range of PTFE particle contents in the polymer compositions without the necessity of a polymerization to produce each desired state in the range. Similarly, after the core/shell polymer is isolated from the polymer dispersion, it may be blended with melt fabricable fluoropolymer polymer, for example in pelletized form, and melt blended to make compositions having lower PTFE particle content than the core/shell polymer itself. In this way a single core/shell polymerization can, with subsequent blending, provide a range of polymer compositions with varying PTFE particle content. The core/shell polymer can be regarded as a concentrate when used with further blending. If the core/shell polymer is first pelletized, then physical blends of it with pelletized melt fabricable fluoropolymer can be used in the blow molding process directly, relying on the extruder to melt blend the polymer pellets in the course of blow molding.

The perfluoropolymer composition of the invention, whether it is the result of dispersion blending or of core/shell polymer dispersion or of melt-mixed polymer, is usually used in pelletized form. The dispersion blend or the core/shell polymerization is isolated, for example by coagulation, by freezing and thawing, or by addition of electrolyte such as aqueous nitric acid or ammonium carbonate, or by mechanical agitation. The aqueous medium is separated, the coagulate dried, and then melt extruded through a hole die, after which it is cut, either in the melt (melt cutting) or after cooling and solidification, to make pellets. In the pelletized form, the melt processible perfluoropolymer forms the matrix or continuous phase, and the PTFE particles, the discrete phase.

As used in the Examples herein, the following terms shall have the following meanings based upon the equipment used to run the Examples:

Parison Extrusion Time: is the time required to extrude in a vertical direction a 13 inch (33 cm) parison.

Parison Hang Time: occurs when a 13 inch (33 cm) parison is extruded in a vertical direction as described herein under the heading of Polymer Evaluation in Blow Molding, the extruder is turned off and the timer is started to measure the time that it takes the parison to stretch the distance from the extruder to the designated surface (e.g. floor) below the extruder. The distance from the base of the parison to the floor is about 40 inches (101.6 cm). The distance from the extruder or top of the parison to the floor is 53 inches (134.6 cm) (i.e. 40 inch+13 inch=53 inch).

Slug weight: is the weight of the parison in the Parison Hang Time test.

Test Procedures

The procedures for determining melt viscosity, melt flow rate (MFR), and MIT Flex Life are discussed herein. All of the core/shell polymers disclosed in the Examples exhibited a melt viscosity of less than about $5 \times 10^4$ Pa·s at 350° C. and a shear rate of 101 $s^{-1}$.

The thixotropy of the melt blends disclosed herein is determined by capillary rheometry method of ASTM D 3835-02 in which the melt temperature of the polymer in the rheometer is 350° C. This method involves the extrusion of molten polymer through the barrel of a Kayeness® capillary rheometer at a controlled force to obtain the shear rate desired. The results are reported in the Examples as melt viscosity change (reduction or difference), $\Delta\eta$, in Pa·s in increasing the shear rate on the molten polymer from 11.9 $s^{-1}$ to 101 $s^{-1}$. The melt viscosities are determined at these two shear rates, and the viscosity difference is determined by subtracting the melt viscosity at the shear rate of 101 $s^{-1}$ from the melt viscosity at the shear rate of 11.9 $s^{-1}$.

The non-melt flowability of the PTFE can also be characterized by high melt creep viscosity, sometimes called specific melt viscosity, as described above, which involves the measurement of the rate of elongation of a molten sliver of PTFE under a known tensile stress for 30 min, as further described in and determined in accordance with U.S. Pat. No. 6,841,594, referring to the specific melt viscosity measurement procedure of U.S. Pat. No. 3,819,594. In this test, the molten sliver made in accordance with the test procedure is maintained under load for 30 min, before the measurement of melt creep viscosity is begun, and this measurement is then made during the next 30 min of applied load. The PTFE preferably has a melt creep viscosity of at least about $1 \times 10^6$ Pa·s, more preferably at least about $1 \times 10^7$ Pa·s, and most preferably at least about $1 \times 10^8$ Pa·s, all at 380° C. This temperature is well above the first and second melt temperatures of PTFE of 343° C. and 327° C., respectively. As described above, MFRs for the melt-fabricable perfluoropolymer can be in the range of about 0 to 500 g/10 min, but are typically preferred in the range of about 0 to 100 g/10 min, and more preferably in the range of about 0 to 50 g/10 min as measured according to ASTM D1238-94a and, following the detailed conditions disclosed in U.S. Pat. No. 4,952,630, at the temperature which is standard for the resin. (See, for example, ASTM D 2116-91a and ASTM D 3307-93 that are applicable to the most common melt-fabricable fluoropolymers, both specifying 372° C. as the resin melt temperature in the Plastometer®).

The elongation at break and tensile strength are determined by the ASTM D 638-03 procedure on dumbbell-shaped test specimens 15 mm wide by 38 mm long and having a web thickness of 5 mm, stamped out from 60 mil (1.5 mm) thick compression molded plaques. The disclosures of elongation and tensile strength parameters and values herein are with reference to and are obtained by following this procedure using the compression molded plaques, unless otherwise indicated.

The procedure for measuring MIT Flex Life is disclosed by the ASTM D 2176 using an 8 mil (0.21 mm) thick compression molded film. The disclosures of the MIT Flex Life parameter and values herein are with reference to and are obtained using either an 8 mil (0.21 mm) or a 55 mil (1.4 mm) thick compression molded film. The compression molding of the plaques and film used in these tests was carried out on fine powder (the product of coagulating and drying the dispersion) under a force of 20,000 lbs (9070 kg) at a temperature of 350° C. to make 6×6 in (15.2×15.2 cm) compression moldings. In greater detail, to make the 55 mil (1.4 mm) thick plaque, the fine powder was added in an overflow amount to a chase which was 60 mil (1.5 mm) thick. The chase defines the 6×6 in sample size. To avoid sticking to the platens of the compression molding press, the chase and fine powder filling are sandwiched between two sheets of aluminum foil. The press platens are heated to 350° C. This sandwich is first pressed for 5 min at about 200 lb (91 kg) to melt the fine powder and cause it to coalesce, followed by pressing at 10,000 lb (4535 kg) for 2 min, followed by 20,000 lb (9070 kg) for 2 min, followed by release of the pressing force, removal of the compression molding from the chase and sheets of aluminum foil, and cooling in air under a weight to prevent warping of the plaque. The film samples used in the MIT test were ½ in (1.27 cm) wide strips cut from the compression molded film. Compression molding of the core/shell polymer coagulated and dried into fine powder produces the dispersion of the PTFE core in a continuous matrix of the shell perfluoropolymer. The compression molding is necessary to give the test specimen strength. If the powder were merely coalesced by heating at the temperature of the compression molding, to simulate the fusing of a coating, the resultant coalesced article would have little strength.

The solids content of PTFE raw (as polymerized) dispersion is determined gravimetrically by evaporating a weighed aliquot of dispersion to dryness and weighing the dried solids. Solids content is determined by dividing the weight of the dried solids by the weight of the aliquot, and is stated in weight %, which is based on combined weights of PTFE and water. Alternatively, solids content can be determined by using a hydrometer to determine the specific gravity of the dispersion and then by reference to a table relating specific gravity to solids content. (The table is constructed from an algebraic expression derived from the density of water and density of as polymerized PTFE.) Raw dispersion particle size (RDPS) is measured by photo correlation spectroscopy.

The shell perfluoropolymer composition is determined by infrared analysis on compression molded film made from the core/shell polymer particles in accordance with the procedures disclosed in U.S. Pat. No. 4,380,618 for the particular fluoromonomers (HFP and PPVE) disclosed therein. The analysis procedure for other fluoromonomers are disclosed in the literature on polymers containing other such fluoromonomers. For example, the infrared analysis for PEVE is disclosed in U.S. Pat. No. 5,677,404. The perfluoropolymer shell is made following the copolymerization recipe used to make the perfluoropolymer by itself. The perfluoropolymer composition of the core/shell polymers of the present invention, however, is determined on the entire core/shell polymer. The composition of the shell is calculated by subtracting the weight of the TFE consumed to make the PTFE core from the weight of the entire core/shell polymer.

Figure 4:
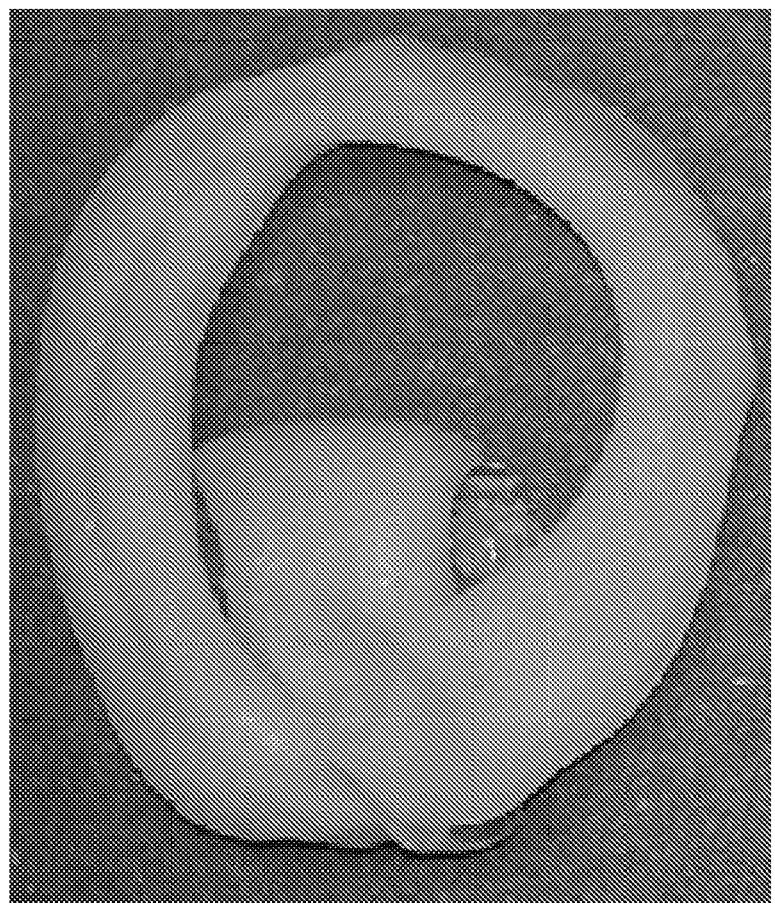
FIG. 4 shows a blow molded sample of Comparative Example 1 that contains no PTFE.
Figure 7:
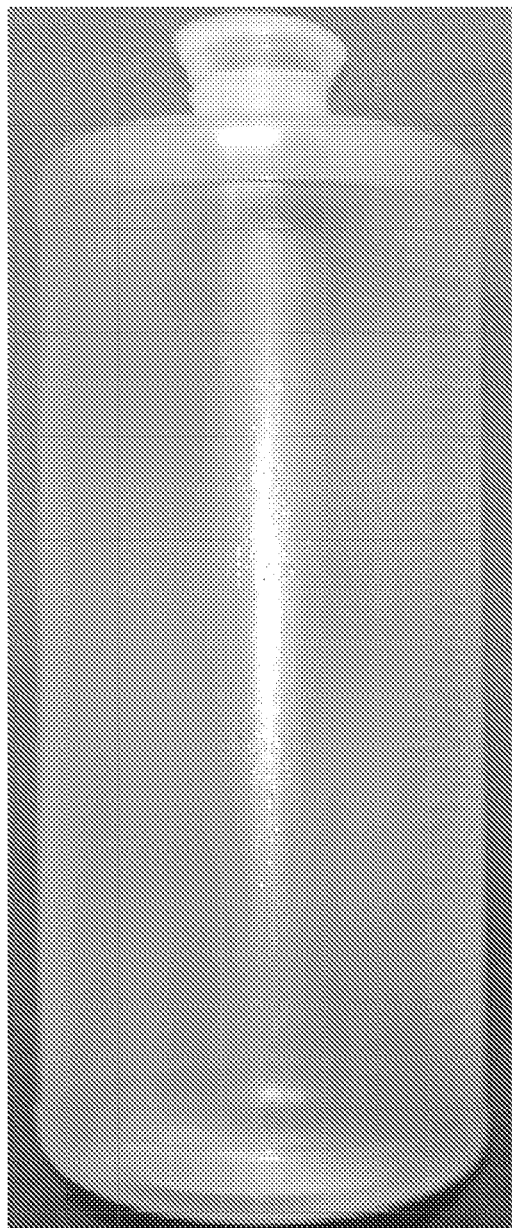
FIG. 7 shows a blow molded sample of Example 6 which contains 5 wt % PTFE.

Blow Molding:

The blow molding data in Table 2 shows both the core/shell polymer of Example 6 (i.e. 5 wt % polytetrafluoroethylene (PTFE) core/shell polymer has a PTFE core/PFA shell) and high and low solids dispersion blends with content of PTFE varying from 5 wt %-1 wt % (Examples 1a-5b). Comparative Example 1 in Table 2 is a conventional PFA polymer (see Example A for its preparation and properties) to show the improvement of the present invention using the core/shell polymer of Example 6 and dispersion blends over PFA alone. The core/shell polymer of Example 6 was composed of about 5 wt % sinterable PTFE core with shell similar in composition to the polymer of Comparative Example 1. The shell contains 4.3 wt % perfluoro(propyl vinyl ether) (PPVE). The MFR of the shell is estimated to be 12 g/10 min based on the recipe employed. FIG. 4 shows the result of blow molding Comparative Example 1 in which no bottle was formed. In comparison, FIG. 7 shows a full bottle formed (Quality Rating A) using the composition of Example 6.

Example A

PFA Dispersion Preparation

The PFA polymer of this example is similar to the commercial polymer Teflon® PFA 340 (available from E.I. du Pont de Nemours & Co, Wilmington, Del.). The aqueous dispersion of copolymer of tetrafluoroethylene and perfluoro (propyl vinyl ether) (PFA dispersion) is made as follows: A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, and 240 mL 20 wt % solution of ammonium perfluorooctanoate surfactant in water. With the reactor paddle agitated at 50 rpm, the reactor was evacuated and purged three times with tetrafluoroethylene (TFE). Ethane was added to the reactor until the pressure was 8 inches Hg (3.93 psig, 27.1 kPa), then 200 mL of perfluoro(propyl vinyl ether) (PPVE) were added. The reactor temperature was then increased to 75° C. After the temperature had become steady at 75° C., TFE was added to the reactor to achieve a final pressure of 250 psig (1.75 MPa). An aliquot of 400 mL of a freshly prepared aqueous initiator solution containing 0.2 wt % of ammonium persulfate (APS) was charged to the reactor. This same initiator solution was pumped into the reactor at 5 mL/min for the remainder of the batch. After polymerization had begun, as indicated by a 10 psi (0.07 MPa) drop in reactor pressure, additional TFE was added to the reactor at a rate of 0.167 lb/min (75.6 g/min) until a total of 20 lb (9080 g) of TFE had been added after kickoff. PPVE was added at 2.0 mL/min for the duration of the batch, 120 min. At the end of the reaction period, the TFE, PPVE, and initiator feeds were stopped and the reaction vessel was vented. When the reactor pressure reached 5 psig (0.035 MPa), the reactor was swept with nitrogen, then the reactor contents were cooled to 50° C. before the dispersion was discharged from the reactor. The solids content of the dispersion was 37.0 wt %, and the raw dispersion particle size (RDPS) was 0.200 μm. For purposes of analysis, a portion of the dispersion was coagulated and the polymer was isolated by filtering. The polymer was then dried in a 150° C. convection air oven. This TFE/PPVE copolymer had a melt flow rate (MFR) of 11 g/10 min, a PPVE content of 3.85 wt %, melting points of 305° C. and 328° C., and an MIT flex life of 1355 cycles. The tensile strength of the PFA was 4086 psi (28.2 MPa) and the elongation at break was 358%.

Example B

PTFE Dispersion Preparation

This Example describes the aqueous homopolymerization of tetrafluoroethylene to make PTFE dispersion.

A cylindrical, horizontal, water-jacketed, paddle-stirred, stainless steel reactor having a length to diameter ratio of about 1.5 and a water capacity of 10 gallons (37.9 L) was charged with 54.0 pounds (24.5 kg) of demineralized water, 240 mL of a 20 wt % solution of ammonium perfluorooctanoate surfactant in water, and 5.0 g Krytox® 157 FSL, available from E.I. du Pont de Nemours and Company, Inc. Krytox® 157 FSL is a perfluoropolyether carboxylic acid as further described in Table 1 of U.S. Pat. No. 6,429,258. With the reactor paddle agitated at 50 rpm, the reactor was heated to 60° C., evacuated and purged three times with tetrafluoroethylene (TFE). The reactor temperature then was increased to 75° C. After the temperature had become steady at 75° C., the pressure of the reactor was raised to 300 psig (2.07 MPa) using TFE. Four hundred milliliters of an initiator solution consisting of 0.20 wt % APS in water was injected to the reactor, then this same initiator solution was added at 5.0 mL/min. After polymerization had begun as indicated by a 10 psi (0.07 MPa) drop in reactor pressure, additional TFE was added at 0.2 lb (90.8 g)/min for 1.0 min. After 0.2 lbs (90.8 g) of TFE had been fed after initiation, the TFE and initiator feeds were stopped and the reactor was vented. The contents of the reactor were cooled to 50° C. before being discharged. Solids content of the dispersion was 1.36 wt % and raw dispersion particle size (RDPS) was 25 nm.

Examples C to F

PTFE Dispersion Preparation

Additional PTFE dispersions were prepared according to the procedure of Example B, varying the amount of TFE polymerized. Results are summarized in Table 1 which shows the PTFE dispersions of varying particle size for Example B in addition to Examples C-G.

TABLE 1

| Example | TFE Polymerized (g) | Solids Content (wt %) | RDPS (nm) |
|---|---|---|---|
| B | — | 1.36 | 25 |
| C | 454 | 1.55 | 28 |
| D | 363 | 2.04 | 32 |
| E | 272 | 2.46 | 32 |
| F | 181 | 2.69 | 34 |
| G | 4536 | 18.36 | 85 |

Examples 1(a, b) to 5(a, b)

The perfluoropolymer compositions of these Examples are made by blending PFA dispersion of Example A with one or another of the PTFE dispersions of Examples B to G, isolating the polymer composition from the dispersion blend, drying and pelletizing the isolated polymer composition.

Example 1a is made from the dispersion blend of Example A PFA dispersion and Example B 25 nm PTFE dispersion, the proportions blended being such that the resulting polymer composition contains 1 wt % PTFE. A cylindrical, vertical, water and steam-jacketed, baffled, stainless steel vessel having a length to diameter ratio of about 1.5 and a water capacity of 30 gallons (113.6 L) was charged with 73.14 lbs (33.18 kg) of the PFA dispersion of Example 1, and 19.83 lbs (8.99 kg) of the PTFE dispersion of Example 2. The two dispersions were mixed for 30 min at ambient temperature by overhead agitation using a 25 horsepower Lightnin' Mixer operating at 25 rpm. After 30 min, 10.68 lbs (4.84 kg) of a solution consisting of 20 wt % ammonium carbonate in demineralized water and 41.86 lbs (18.99 kg) demineralized water were added to the vessel. The resulting mixture was stirred at 300 rpm until gelation occurred. Upon gelation, 26.70 lbs (12.11 kg) of Vertrel® XF were added to the vessel and the contents were further agitated at 800 rpm for 5 min. Vertrel® XF is a nonflammable hydrofluorocarbon solvent available from E.I. du Pont de Nemours and Co. Inc., and is 2,3-dihydrodecafluoropentane. The agitation speed was decreased to 300 rpm and the temperature of the vessel's contents was increased to 60° C. using steam. When the contents of the vessel reached 60° C., a valve in the top of the vessel was opened to allow the Vertrel® XF to distill off. This spent Vertrel® XF was recovered by subsequent condensation. After removal of all practicably recoverable Vertrel® XF, the contents of the vessel were allowed to cool to 45° C. and were discharged from the vessel using a bottom-mounted valve. The now-coagulated PTFE/PFA blend was dried at 150° C. for 3 days, then further dried at 280° C. for 14 hours using convection air ovens. The resulting blend had a melt flow rate of 6.2 g/10 min at 372° C., a tensile strength of 4274 psi (29.47 MPa), and an elongation at break of 345%. Its MIT flexural endurance as a 50 mil film was 862 cycles.

Example 2a is made following the same general procedure blending from the dispersion blend of Example A's PFA dispersion and Example C's 28 nm PTFE dispersion, the proportions blended being such that the resulting polymer composition contains 2 wt % PTFE.

Example 3a is made following the same general procedure blending from the dispersion blend of Example A's PFA dispersion and Example D's 32 nm PTFE dispersion, the proportions blended being such that the resulting polymer composition contains 3 wt % PTFE.

Example 4a is made following the same general procedure blending from the dispersion blend of Example A's PFA dispersion and Example E's 32 nm PTFE dispersion, the proportions blended being such that the resulting polymer composition contains 4 wt % PTFE.

Figure 5:
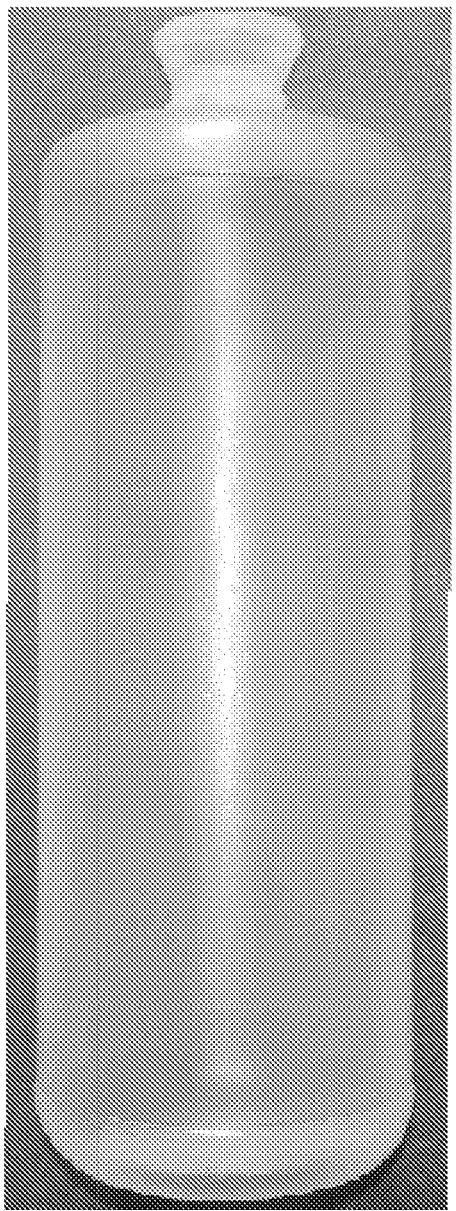
FIG. 5 shows a blow molded sample of Example 5a which contains 5 wt % PTFE.

Example 5a is made following the same general procedure blending from the dispersion blend of Example A's PFA dispersion and Example F's 35 nm PTFE dispersion, the proportions blended being such that the resulting polymer composition contains 5 wt % PTFE. The blow molded bottle made as described by Example 5a discloses a Quality Rating A bottle as shown in FIG. 5.

Figure 6:
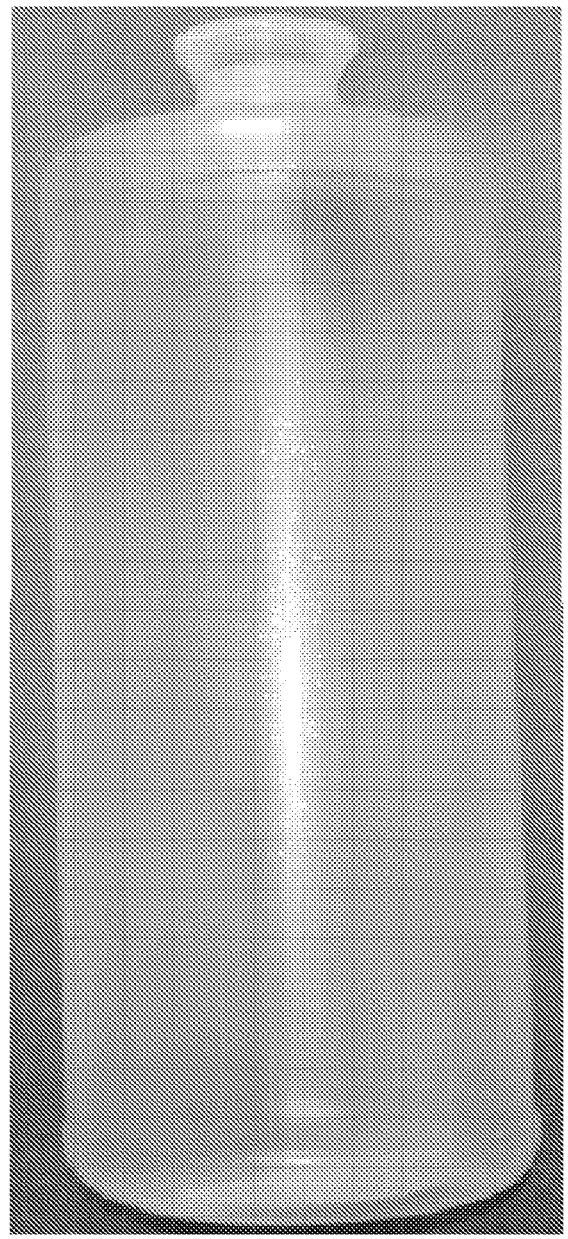
FIG. 6 shows a blow molded sample of Example 5b which contains 5 wt % PTFE.

Examples 1b to 5b are made following the same general procedure blending from the dispersion blend of Example A's PFA dispersion and Example G's 85 nm PTFE dispersion, the proportions blended being such that the resulting polymer compositions containing 1 wt %, 2 wt %, 3 wt %, 4 wt %, and 5 wt % PTFE, respectively. FIG. 6 shows a blow molded bottle of Quality Rating A using the procedure of Example 5b which contains 5 wt % PTFE.

Example 6

The core/shell polymer has a core of PTFE homopolymer and a shell of TFE/PPVE copolymer. The shell polymer has a melting point of 305° C. and an MFR of 12 g/10 min as estimated from the results of similar polymerizations The core/shell polymer is made as follows: A cylindrical, horizontal, water-jacketed, paddle-stirred, stainless steel reactor having a length to diameter ratio of about 1.5 and a water capacity of 10 gallons (37.9 L) was charged with 54 pounds (24.5 kg) of demineralized water, 5 g Krytox® 157FSL, and 240 mL of a 20 wt % solution of ammonium perfluorooctanoate surfactant in water. With the reactor paddle agitated at 50 rpm, the reactor was evacuated and purged three times with tetrafluoroethylene (TFE). The reactor temperature then was increased to 75° C. After the temperature had become steady at 75° C., the pressure of the reactor was raised to 300 psig (2.1 MPa) using TFE. Four hundred milliliters of an initiator solution consisting of 0.2 wt % APS in water was injected to the reactor, then this same initiator solution was added at 5.0 mL/min. After polymerization had begun as indicated by a 10 psi (0.07 MPa) drop in reactor pressure, additional TFE was added at 0.2 lb (90.8 g)/min for 5 min. After 4 lb (1816 g) of TFE was fed after initiation, the TFE and initiator feeds were stopped, then the reactor was slowly vented. After stopping agitation, the reactor vapor space was evacuated. Agitation was resumed at 50 rpm, then the contents were cooled to 25° C. The agitator was again stopped, then the pressure in the reactor was raised to 8 in Hg (3.93 psig, 27.1 kPa) with ethane. After the addition of ethane, the agitator was restarted at 50 rpm and the contents of the reactor were warmed to 75° C. A 200 mL aliquot of perfluoro(propyl vinyl ether) (PPVE) was added, then the pressure in the reactor was raised to 250 psig (1.75 MPa) with TFE. For the duration of the reaction, PPVE was added at 2.0 mL/min and initiation was resumed using the same solution at a rate of 5 mL/min. The pressure of TFE in the reactor was continuously adjusted to maintain a reaction rate of 0.167 lb TFE/min (75.7 g/min). After 16 lbs (8618 g) TFE reacted in 96 min, the reaction was terminated by stopping TFE, initiator, and PPVE feeds, then venting the reactor. Solids content of the dispersion was 29.3 wt %, and the raw dispersion particle size (RDPS) was 0.105 µm. After coagulation, the polymer was isolated by filtering and then dried in a 150° C. convection air oven. This core/shell polymer had detectible melt flow rate (MFR) (2 g/10 min), a PPVE content of 4.59 wt %, melting points of 306 and 326° C., and an MIT flex life of 395879 cycles. The core shell polymer also exhibited a tensile strength of 4126 psi (28.4 MPa) and elongation at break of 338%. The PTFE core content was 4.8 wt %, and the viscosity difference ($\Delta\eta$) was 8505 Pa·s. The core/shell polymer has 5 wt % PTFE core and 95% PFA shell, with an MFR of 4.1 g/10 min. The PFA is made as described above in Example A.

FEP Dispersion Preparation

A cylindrical, horizontal, water-jacketed, paddle-stirred, stainless steel reactor having a length to diameter ratio of about 1.5 and a water capacity of 10 gallons (37.9 L) was charged with 50 pounds (22.7 kg) of demineralized water and 330 mL of a 20 wt % solution of ammonium perfluorooctanoate surfactant in water. With the reactor paddle agitated at 46 rpm, the reactor was heated to 60° C., evacuated and purged three times with tetrafluoroethylene (TFE). The reactor temperature then was increased to 103° C. After the temperature had become steady at 103° C., HFP was added slowly to the reactor until the pressure was 444 psig (3.1 MPa). Ninety-two milliliters of liquid PEVE was injected into the reactor. Then TFE was added to the reactor to achieve a final pressure of 645 psig (4.52 MPa). Forty milliliters of freshly prepared aqueous initiator solution containing 1.04 wt % of ammonium persulfate (APS) and 0.94 wt % potassium persulfate (KPS) was charged into the reactor. Then, this same initiator solution was pumped into the reactor at 10 mL/min for the remainder of the polymerization. After polymerization had begun as indicated by a 10 psi (0.07 MPa) drop in reactor pressure, additional TFE was added to the reactor at a rate of 24.5 lb (11.1 kg)/125 min until a total of 24.5 lbs (11.1 kg) of TFE had been added to the reactor after kickoff. Furthermore, liquid PEVE was added at a rate of 1.0 mL/min for the duration of the reaction. The total reaction time was 125 min after initiation of polymerization. At the end of the reaction period, the TFE feed, PEVE feed, and the initiator feed were stopped, and the reactor was cooled while maintaining agitation. When the temperature of the reactor contents reached 90° C., the reactor was slowly vented. After venting to nearly atmospheric pressure, the reactor was purged with nitrogen to remove residual monomer. Upon further cooling, the dispersion was discharged from the reactor at below 70° C. Solids content of the dispersion was 36.81 wt % and raw dispersion particle size (RDPS) was 0.167 µm. A portion of the dispersion was coagulated to produce material for testing. After coagulation, the polymer was isolated by filtering and then drying in a 150° C. convection air oven. This polymer was stabilized by heating at 260° C. for 1.5 hr in humid air containing 13 mol % water. The TFE/HFP/PEVE terpolymer (FEP) had a melt flow rate (MFR) of 37.4 g/10 min, an HFP content of 10.5 wt %, a PEVE content of 1.26 wt %, and a melting point of 260° C. For this material, the viscosity change (reduction), $\Delta\eta$, was 101 Pa·s. The FEP exhibited a tensile strength and elongation at break of 2971 psi (20.8 MPa) and 310%, respectively. This is a typical preparation of high-performing FEPs. In blow molding bottles FEP performs like PFA.

Polymer Evaluation in Blow Molding

The polymers of Examples 1-6 and Comparative Example 1 after extrusion into a pelletized form were made into 1-quart Boston Round bottles using a Rocheleau R-7A blow molding machine featuring a stainless steel "D" head with a 0.759 inch (19.28 mm) bushing assembly and a 0.562 inch (14.27 mm) die. The machine has an extruder featuring a 1.5 inch (38 mm) diameter screw with 26:1 length to diameter ratio and a 2:1 compression ratio. Parison length extruded for hang time is about 13 inches (33 cm) and for feed rate is also about 13 inches (33 cm). The extruder temperature profile was the following:

Zone 1 330° C.
Zone 2 350° C.
Zone 3 370° C.

Figure 2:
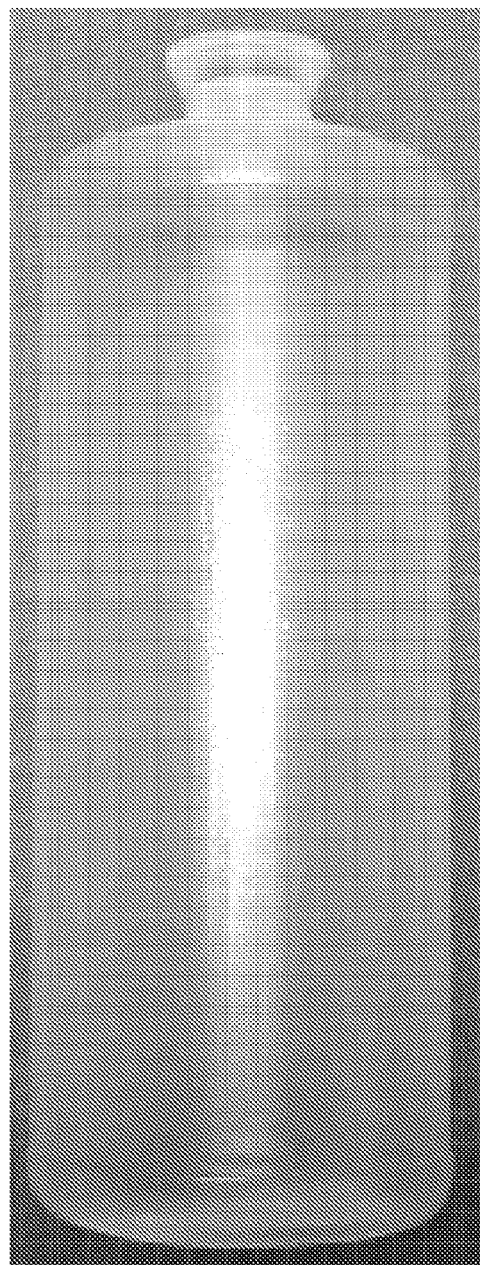
FIG. 2 shows a blow molded bottle using 5 wt % PTFE large particles in the PTFE dispersion blend.
Figure 3:
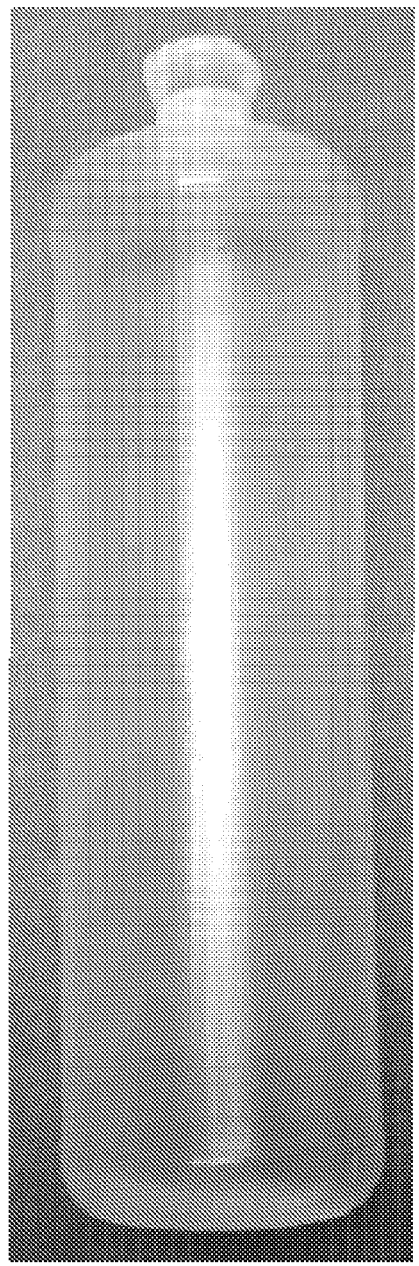
FIG. 3 shows a blow molded bottle using 5 wt % PTFE small particles in the PTFE dispersion blend.

FIGS. 1-3 show examples of blow molded bottles having a good bottle quality rating of A (each of the blown bottles having 5 wt % PTFE particles). The examples shown are about 1 quart size blown bottles. Table 2 summarizes the blow molding results. The key for the quality of the blow molded bottles is as follows (i.e. Quality Rating):

A. Good bottles with no melt fracture and uniform wall thickness.
B. A useable bottle having a slight melt fracture on a section of the bottle wall.
C. A useable bottle with a slight melt fracture and thinning on a section of the bottle wall.
D. Few of the bottles made where useable due to some portion of the bottle being incompletely formed and/or holes and/or an occasional failure to make a bottle at all.
E. No bottles could be made.

The Quality Rating of D for Examples 1a, 2a, and 3a, similarly exhibit short parison hang times, the longest being no longer than about 5 seconds.

The perfluoropolymer composite from core/shell polymer and the perfluoropolymer composite from the dispersion blends do make bottles. The best performance is achieved with the core/shell polymer and the dispersion blend with 5 wt % PTFE at 85 nm particle size. Acceptable bottles are made from dispersion blends with PTFE particle size of 85 nm even at 1 wt % PTFE in the blend. The blends with PTFE in the 25-34 nm range formed acceptable bottles at 5 wt % and 4 wt % PTFE, but at lower weight percents, the quality declines.

The Examples show that core/shell polymer and dispersion blends made with PTFE of larger rather than smaller particle size are preferred, though with dispersion blends made with PTFE of smaller particle size, good bottles can be made if the PTFE wt % is greater than would be necessary in the case of the blends from PTFE of larger particle size. Similar results are expected of melt-mixed polymers.

It is therefore, apparent that there has been provided in accordance with the present invention, a process for blow molding using fluoropolymer core/shell or a fluoropolymer blend that fully satisfies the aims and advantages hereinbefore set forth. While this invention has been described in conjunction with a specific embodiment thereof, it is evident that many alternatives, modifications, and variations will be

TABLE 2

| Examples | Comp, Ex. 1 | 1a | 1b | 2a | 2b | 3a | 3b | 4a | 4b | 5a | 5b | 6 |
|---|---|---|---|---|---|---|---|---|---|---|---|---|
| Polymer | 440 HP B | PFA blend | PFA blend | PFA blend | PFA blend | PFA blend | PFA blend | PFA blend | PFA blend | PFA blend | PFA blend | Core/Shell |
| MFR (g/10 min) | 14 | 6.2 | 5.5 | 7.9 | 5.2 | 6.1 | 4.2 | 5.8 | 3.3 | 4.5 | 2.4 | 4.1 |
| Wt % PTFE | 0 | 1 | 1 | 2 | 2 | 3 | 3 | 4 | 4 | 5 | 5 | 5 |
| PTFE size (nm) | No PTFE | 25 | 85 | 28 | 85 | 32 | 85 | 32 | 85 | 34 | 85 | 50 |
| Parison Feed Rate, sec | 6.12 | 7.59 | 11.53 | 7.87 | 15.66 | 10.50 | 19.08 | 13.73 | 24.83 | 16.58 | 31.16 | 25.78 |
| Bottle wt (g) | No bottle | 35 | 58 | 50 | 84 | 60 | 103 | 74 | 109 | 92 | 117 | 128 |
| Parison hang time (sec) | 1.29 | 3.22 | 6.57 | 3.77 | 9.84 | 5.09 | 12.21 | 8.21 | 16.44 | 10.79 | 20.94 | 19.38 |
| Slug wt. (g) | 62 | 59 | 89 | 75 | 127 | 89 | 149 | 115 | 170 | 142 | 174 | Not Measured |
| Bottle Quality | E | D | C | D | C | D | B | C | C | B | A | A |

In Table 2, the wt % PTFE is the wt % PTFE of the combined weights of the PTFE and the melt fabricable perfluoropolymer of the perfluoropolymer composition. The PTFE size is the size of the PTFE core in the core/shell polymer (Example 6) or of the PTFE in the PTFE dispersion of the dispersion blends (other Examples 1a-5b). The Parison Feed Rate is the time to extrude the parison. The Parison Hang Time is defined above. During the Parison Hang Time no bottle is made from the extrudate.

In the above Examples it is seen that the commercial PFA 440 HP B does not make bottles under the conditions used. This polymer was selected as a comparison because it is similar to the polymer of the shell in the core/shell polymers, and similar to the PFA dispersion used in the dispersion blending experiments described above. The parison hang time of PFA 440 HP B, 1.29 sec, is too short for the successful completion of the bottle-making cycle (parison extrusion, closing of the mold, expansion of the parison to fill the mold).

apparent to those skilled in the art. Accordingly, it is intended to embrace all such alternatives, modifications and variations that fall within the spirit and broad scope of the appended claims.

It is claimed:

1. Process comprising (a) melt extruding a partially crystalline melt-fabricable perfluoropolymer into an annular shape of predetermined length, and (b) pneumatically expanding said shape while in a melt-fabricable state, said perfluoropolymer containing an effective amount of dispersed sub-micrometer size non-melt flowable PTFE particles to improve said extruding and expanding of said annular shape, wherein the non-melt flowable PTFE particles have a melt creep viscosity of at least about $1 \times 10^6$ Pa·s at 380° C.

2. The process of claim 1, wherein improving said extruding and expanding of said shape produces reduced variation in thickness of said shape.

3. The process of claim 1, wherein improving said extruding and expanding of said annular shape results in said shape having improved uniformity of thickness.

4. The process of claim 1, wherein said extruding and expanding comprises blow molding of said annular shape into an article.

5. The process of claim 4, wherein said blow molding includes the confining of said expanding into the shape of a surrounding mold.

6. The process of claim 1, wherein said PTFE particles are at 25-40 nanometers length in the longest dimension.

7. The process of claim 1, wherein said PTFE particles are at 50-100 nanometers length in the longest dimension.

8. The process of claim 6, wherein the effective amount of PTFE is at least 1 wt % of the PTFE and the perfluoropolymer combined.

9. The process of claim 1 wherein said perfluoropolymer is PFA.

10. The process of claim 1 wherein said perfluoropolymer is FEP.

11. A process comprising melt extruding a partially crystalline melt-fabricable perfluoropolymer containing from 0.1 to 50 wt % dispersed sub-micrometer size non-melt flowable PTFE particles, based on the combined weights of partially crystalline melt-fabricable perfluoropolymer and sub-micrometer size non-melt flowable PTFE particles, having a Parison Hang Time of at least six (6) seconds and a melt flow rate of less than 6.0 g/10 min into an annular shape and expanding said shape while in a melt-fabricable state, wherein the non-melt flowable PTFE particles have a melt creep viscosity of at least about $1 \times 10^6$ Pa·s at 380° C.

12. The process of claim 11, wherein expanding said shape comprises blow molding of said annular shape into an article.

13. The process according to claim 4 or 11, wherein said article being a container of 1 quart (0.95 liter) or greater in size.

* * * * *